(12) United States Patent
Noda

(10) Patent No.: US 6,278,878 B1
(45) Date of Patent: Aug. 21, 2001

(54) MOBILE COMMUNICATIONS SYSTEM WITH PORTABLE TERMINAL FOR FACILITATING CHANNEL SWITCHING

(75) Inventor: Mitsuhiko Noda, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/038,142

(22) Filed: Mar. 11, 1998

(30) Foreign Application Priority Data

Mar. 14, 1997 (JP) .................................................. 9-060415

(51) Int. Cl.[7] .......................................................... H04Q 7/20
(52) U.S. Cl. ........................... 455/436; 455/450; 455/509; 370/331; 370/332; 370/337
(58) Field of Search .................................... 455/436–438, 455/524–25, 403, 465, 426, 450, 509, 513; 370/331–32, 336–37, 347

(56) References Cited

U.S. PATENT DOCUMENTS

| | | | |
|---|---|---|---|
| 5,157,661 | * 10/1992 | Kanai et al. ...................... | 455/436 X |
| 5,276,906 | * 1/1994 | Felix ..................................... | 455/438 |
| 5,327,577 | * 7/1994 | Uddenfeldt ........................... | 455/436 |
| 5,329,635 | * 7/1994 | Wadin et al. .................... | 455/67.1 X |
| 5,416,778 | * 5/1995 | Chan et al. ........................... | 370/330 |
| 5,483,668 | * 1/1996 | Malkamaki et al. ............. | 455/437 X |
| 5,627,880 | * 5/1997 | Rozanski et al. ................ | 455/437 X |
| 5,663,954 | * 9/1997 | Hakkanen et al. .................... | 370/278 |
| 5,898,925 | * 4/1999 | Honkasalo et al. ................... | 455/437 |

* cited by examiner

Primary Examiner—Nay Maung
(74) Attorney, Agent, or Firm—Arent Fox Kintner Plotkiun & Kahn, PLLC

(57) ABSTRACT

A mobile communications system includes a base station that allocates a plurality of pairs of transmission and reception slots to one data frame and a portable terminal that communicates with the base station. At least two pairs of slots are allocated to one portable terminal so that one pair is used to continue a communication session and the other is used to control channels in order to secure a channel for the communication session. The portable terminal detects whether the communication condition is poorer than a first level and whether it is poorer than a second level that is lower than the first level. During a communication session, when the communication condition drops below the first level, the portable terminal requests another base station to newly establish a traffic channel, and, when the communication condition drops below the second level, it switches from the currently used traffic channel to the newly established traffic channel.

5 Claims, 7 Drawing Sheets

MOBILE COMMUNICATIONS SYSTEM WITH PORTABLE TERMINAL FOR FACILITATING CHANNEL SWITCHING

BACKGROUND OF THE INVENTION

1. Field of the Invention

The present invention relates to a mobile communications system such as the digital PHS (Personal Handyphone System), and to a portable terminal for use in such a system.

2. Description of the Prior Art

Conventionally, in the digital PHS system, a base station CS (cordless station) creates one data frame from four transmission slots T1 to T4 and four reception slots R1 to R4, as shown in FIG. 6. On the other hand, a terminal is allowed to use only one reception slot and one transmission slot out of those slots.

For example, a terminal PS1, when it receives a signal from a base station CS, uses a reception slot R1' that corresponds to the transmission slot T1 of the base station CS, and, when it transmits a signal to the base station CS, uses a transmission slot T1' that corresponds to the reception slot R1 of the base station CS. On the other hand, in another terminal PS2, its reception and transmission slots R2' and T2' correspond to the transmission and reception slots T2 and R2, respectively, of the base station CS.

FIG. 7 shows a sequence of steps followed when the communication with a terminal PS1 is transferred from one base station CS1 to another base station CS2. In step #1, the terminal PS1 is at location (a) shown in FIG. 5 and is "communicating", i.e. engaged in a communication session, with the base station CS1. However, as the terminal PS1 moves to location (c), the signal strength of the received signal drops significantly, and the communication condition degrades accordingly (step #2).

This causes the terminal PS1 to request the next base station CS2 to establish a link channel that can be used for a communication session and other purposes (step #3). In response, the base station CS2 allocates a link channel to the terminal PS1 (step #4). Thereafter, the terminal PS1 establishes synchronism with the base station CS2 in steps #6 and #7, establishes communication therewith through the allocated channel (steps #8 to #20), and eventually starts a communication session therewith (step #21). It takes as long as one second between steps #3 and #4; by contrast, it takes only five milliseconds between two consecutive steps from #6 to #20 (e.g. between steps #5 and #6).

In the above sequence of steps, exactly because steps #3 and #4 take a comparatively long time, these steps substantially cause termination of the communication session there. This means that it is necessary to start a new communication session again in step #21. Inconveniently, this causes the user of the terminal to be charged for a new communication session every time the communication with his or her terminal is transferred from one base station to another. In addition, it is also inconvenient that, in step #21, it takes an unduly long time to restart a communication session.

SUMMARY OF THE INVENTION

An object of the present invention is to provide a novel mobile communications system, and a portable terminal for use in it, by use of which communication can be continued without substantially terminating a communication session even when the communication with a particular terminal is transferred from one base station to another as the terminal moves around.

To achieve the above object, according to one aspect of the present invention, in a mobile communications system including a base station for allocating a plurality of pairs of transmission and reception slots to one data frame and a portable terminal for communicating with the base station, at least two pairs of the transmission and reception slots are allocated to one portable terminal so that one pair is used to continue a communication session and the other pair is used to control channels in order to secure a channel for the communication session.

In this system, when the communication condition degrades significantly during a communication session and it is necessary to switch to a channel of the next base station, the switching can be done quickly without terminating the communication session (actually, the communication session is discontinued, but only for a negligibly short time). This is because the next traffic channel is reserved (i.e. established) in advance before the switching takes place. In this way, it is possible to continue a mobile communication session smoothly.

According to another aspect of the present invention, a portable terminal for use in the above mobile communications system is provided with communication condition detecting means for detecting whether or not communication condition is poorer than a first level and whether it is poorer than a second level that is lower than the first level; means for requesting another base station to newly establish a traffic channel when the communication condition drops below the first level; and means for switching from a currently used traffic channel to the newly established traffic channel when the communication condition drops below the second level.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
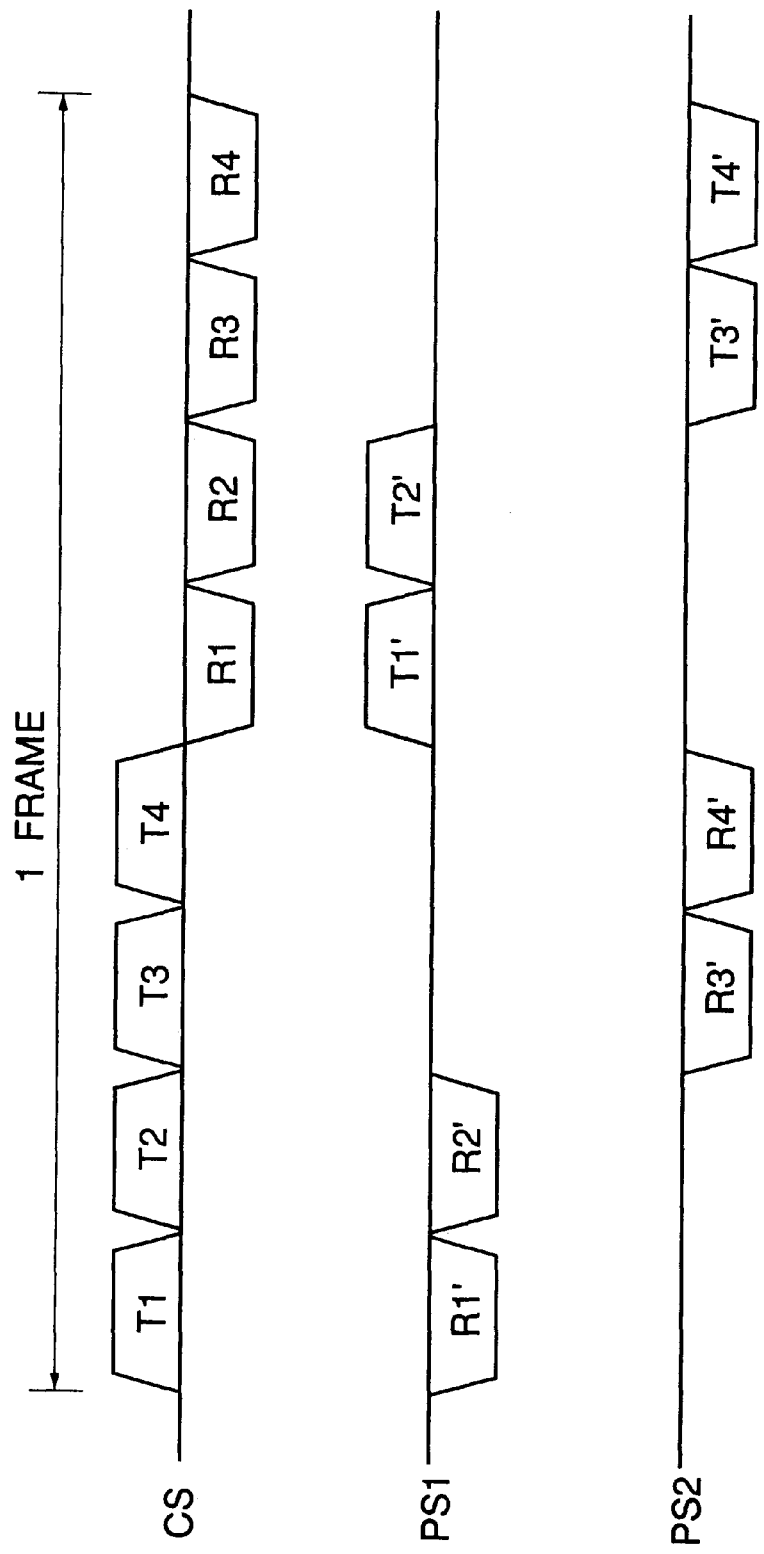
FIG. 1 is a time chart schematically showing the mobile communications system according to the present invention.

Hereinafter, an embodiment of the present invention will be described. In this embodiment, when communication takes place between a base station and a terminal, two slots are allocated to transmission and another two slots are allocated to reception, as shown in FIG. 1.

For example, a terminal PS1 uses slots R1' and R2' for reception as the slots corresponding to the transmission slots T1 and T2 of a base station CS, and uses slots T1' and T2' for transmission as the slots corresponding to the reception slots R1 and R2 of the base station CS. For another terminal PS2, transmission slots T3 and T4 and reception slots R3 and R4 are allocated to the base station, and reception slots R3' and R4' and transmission slots T3' and T4' are allocated to the terminal PS2. It is also possible to allocate T1 and R1 in combination with T3 and R3 to the terminal PS1 and allocate T2 and R2 in combination with T4 and R4 to the terminal PS2.

In this way, in this embodiment, within one data frame, two slots are allocated to transmission and another two are allocated to reception. In both transmission and reception, one slot is used to continue a communication session and the other is used to perform channel control operations. Here, the channel control operations include a process for establishing a channel to be used for a communication session. Note also that a channel here is equivalent to a carrier wave, and therefore that carrier waves having different frequencies correspond to different channels.

In this embodiment, the terminal, using one of the above two pairs of transmission and reception slots, carries out a communication session and concurrently monitors the communication condition. When the communication condition drops below a predetermined level, the terminal, this time using the other pair of transmission and reception slots, reserves a link channel of the next base station. When the communication condition degrades further, the terminal switches the traffic channel to the reserved link channel.

Figure 4:
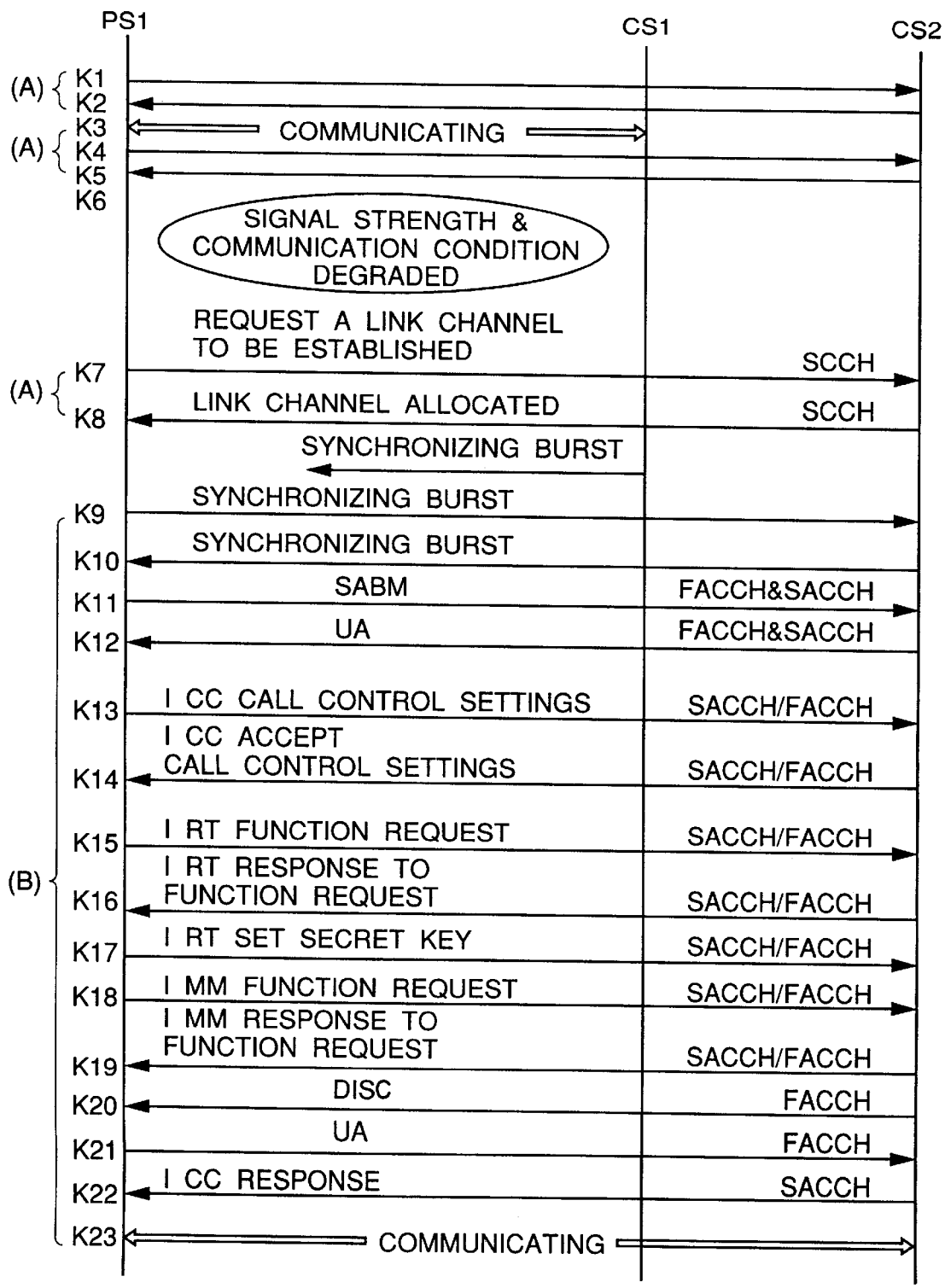
FIG. 4 is a diagram showing the sequence of steps followed to achieve communication in the system of the invention.
Figure 5:
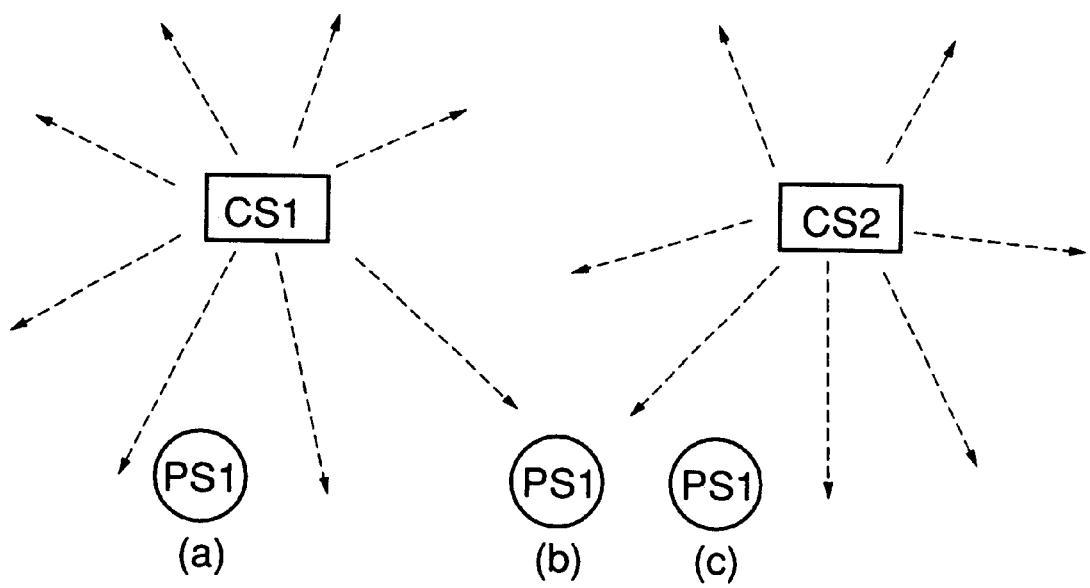
FIG. 5 is a diagram showing the relationships between a portable terminal and base stations.
Figure 6:
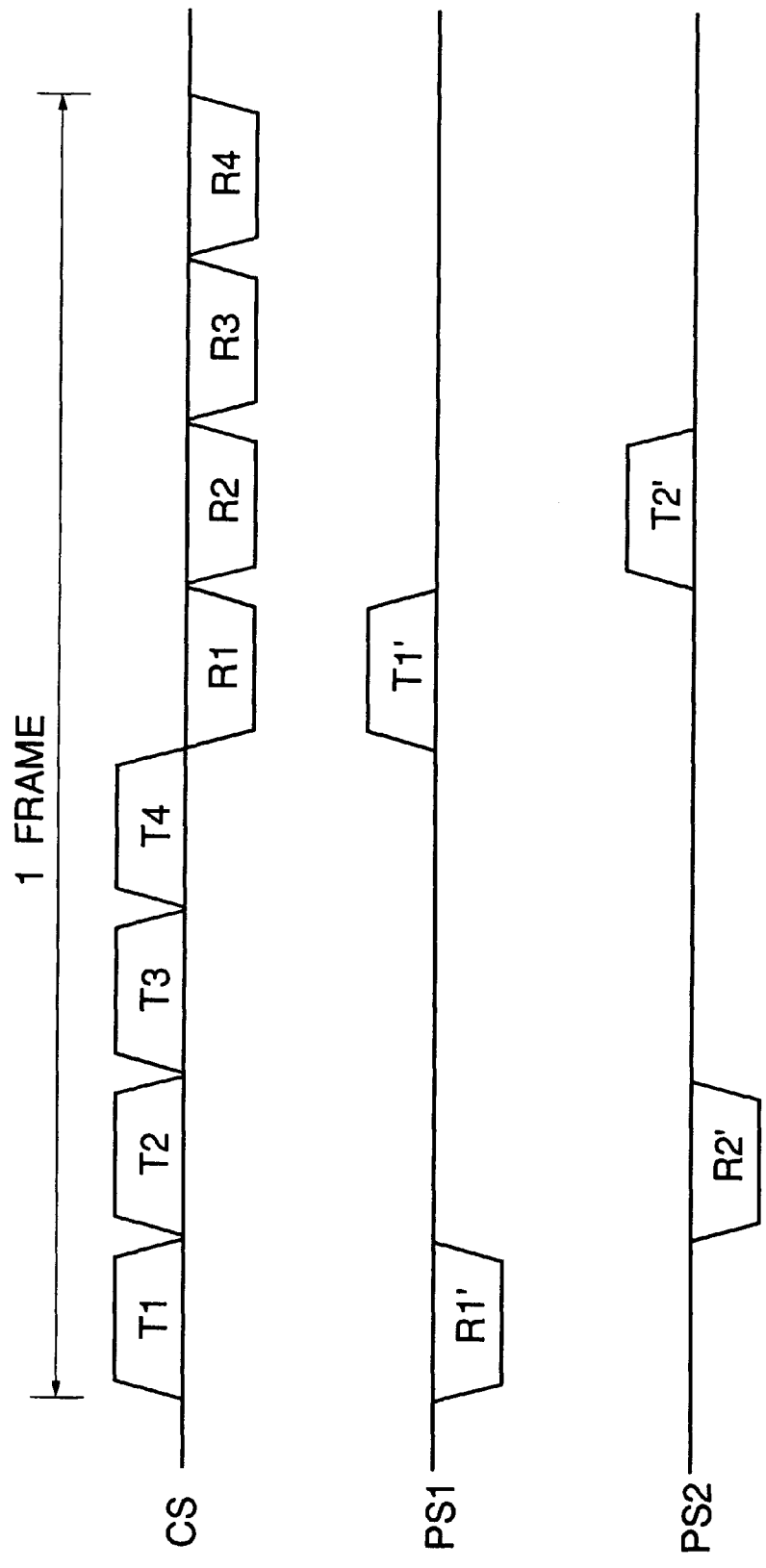
FIG. 6 is a time chart schematically showing the conventional mobile communications system.
Figure 7:
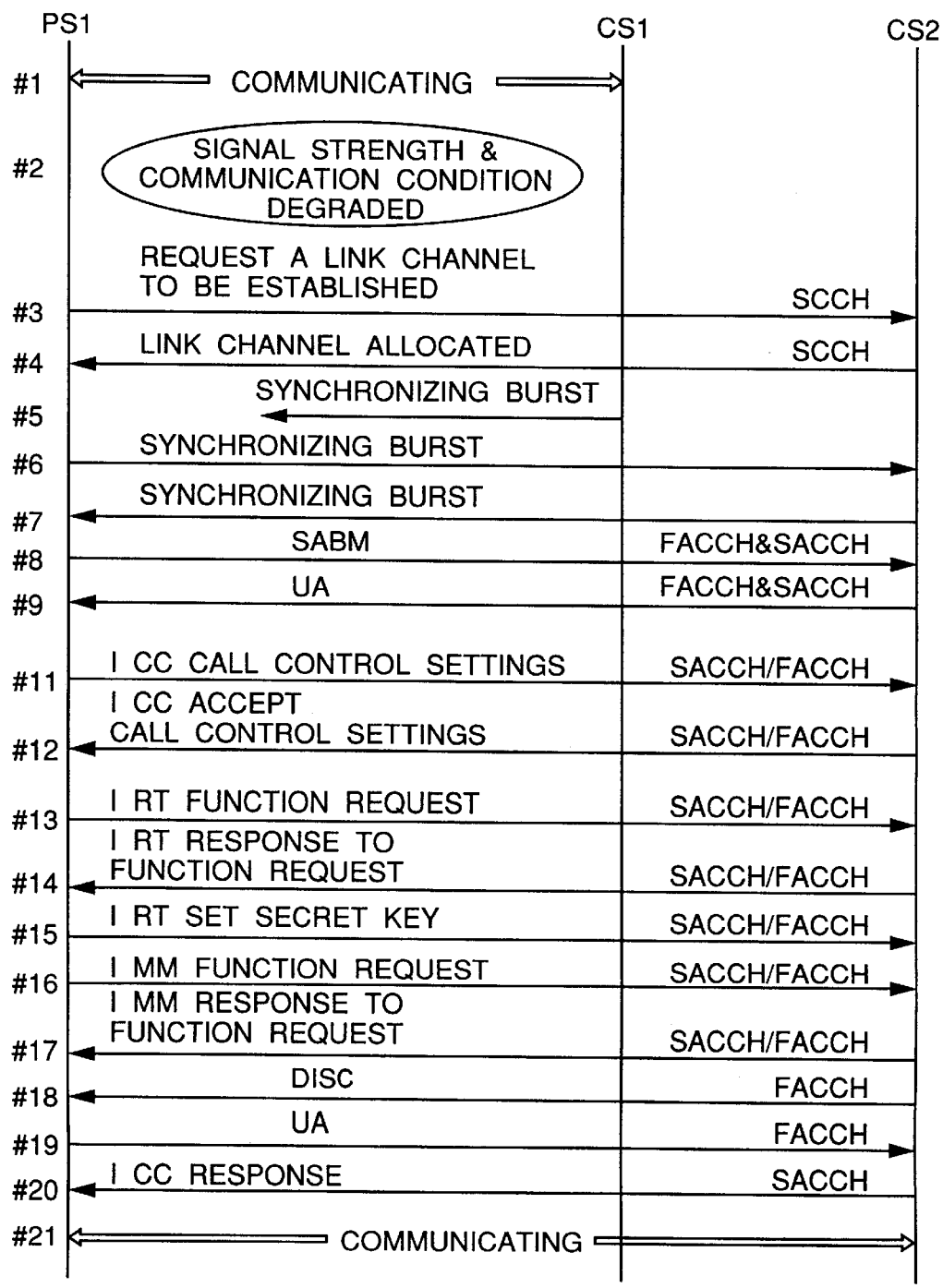
FIG. 7 is a diagram showing the sequence of steps followed to achieve communication in the conventional system.

FIG. 4 shows the sequence of steps followed when the communication with a terminal PS1 is transferred from a base station CS1 to another base station CS2. While the terminal PS1 is at location (a) shown in FIG. 5, i.e. within the service area of the base station CS1, the terminal PS1 is communicating, i.e. engaged in a communication session, with the base station CS1, as indicated by step K1 in FIG. 4. When the terminal PS1 moves to location (b) shown in FIG. 5, the signal strength of the signal received from CS1 drops so much that the communication condition drops below a first predetermined level. In such a situation, sequence (A), indicated as combinations of steps K1 and K2, of steps K4 and K5, and of steps K7 and K8, respectively, is executed. Note that, although the operations that are actually performed in sequence (A) are shown only in steps K7 and K8 in the figure, the same operations are performed also in steps K1 and K2 as well as in steps K4 and K5. When the terminal PS1 moves further to location (c), the communication condition drops below a second level (step K6). In such a situation, sequence (B), shown as a combination of steps K9 to K22, for switching from one base station to another is executed to start the communication with the base station CS2.

In this system, when the communication condition degrades during a communication session and it is necessary to switch to a channel of the next base station, the switching can be done quickly without terminating the communication session (actually, the communication session is discontinued, but only for a negligibly short time). This is because the next traffic channel is reserved (i.e. established) in advance before the switching takes place. In this way, it is possible to continue a mobile communication session smoothly.

Figure 3:
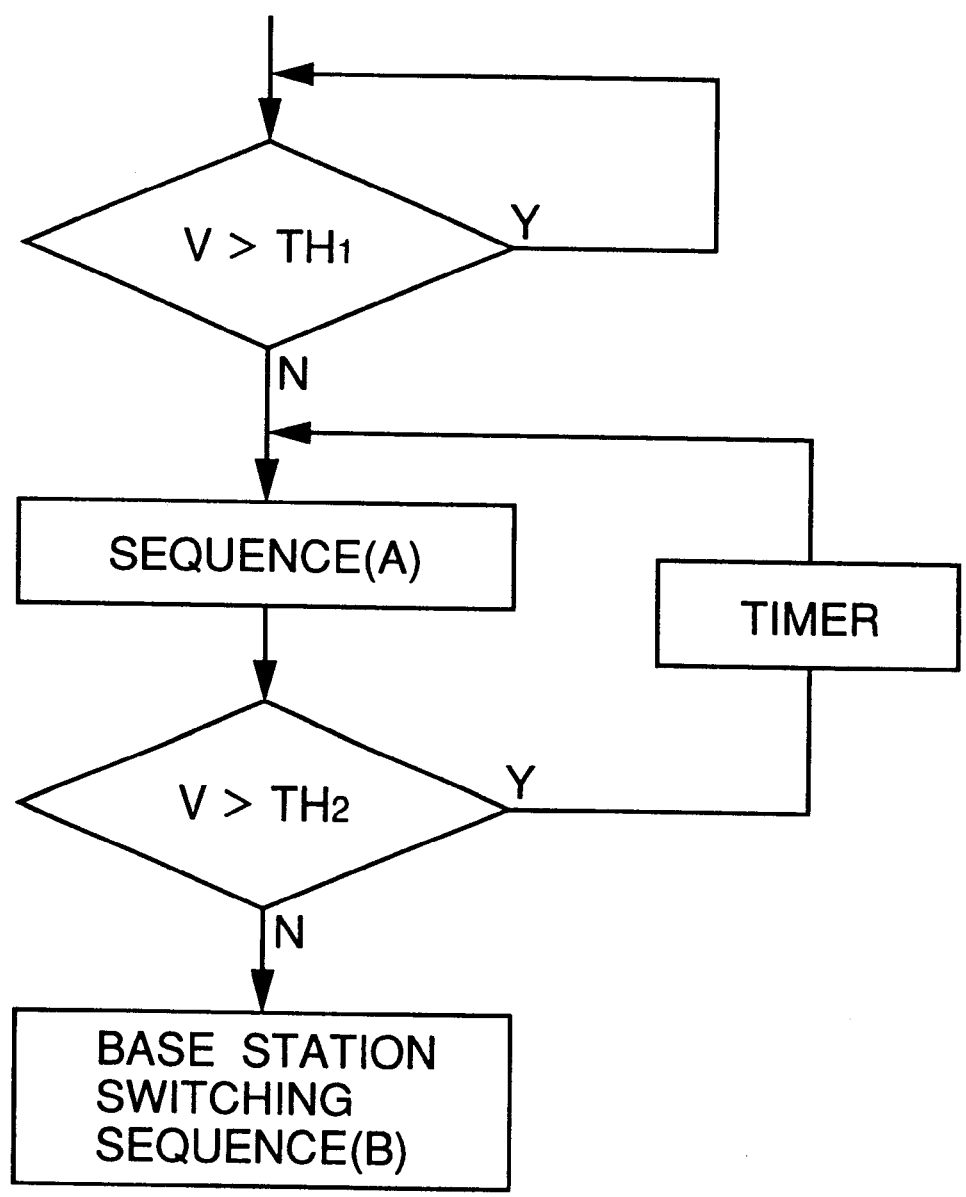
FIG. 3 is a flowchart showing the control operations performed by the controller of the portable terminal.

FIG. 3 is a flowchart related to the above operations. In FIG. 3, V represents the detected communication condition, TH1 represents the first predetermined level, and TH2 represents the second predetermined level. The timer operation that is performed when V>TH2 is for repeating sequence (A) above at regular intervals.

Figure 2:
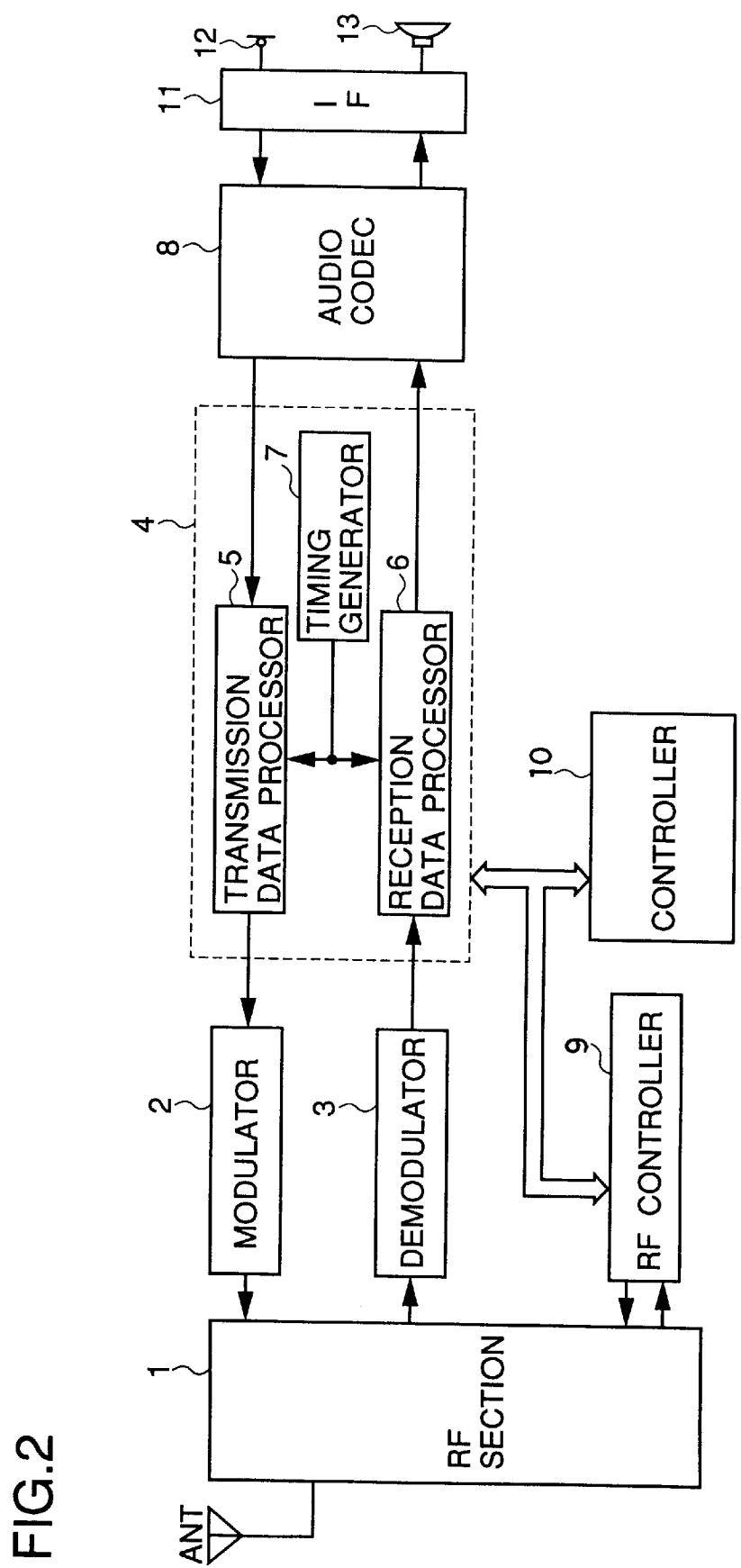
FIG. 2 is a block diagram showing the hardware construction of a portable terminal used in the system of the invention.

FIG. 2 is a block diagram showing the hardware construction of the terminal PS1 (or PS2). In FIG. 2, ANT represents an antenna, numeral 1 represents an RF (radio frequency) section, numeral 2 represents a modulator, numeral 3 represents a demodulator, numeral 4 represents a TDMA/TDD processor, numeral 8 represents an audio codec, numeral 11 represents an audio interface, numeral 12 represents a microphone, numeral 13 represents a speaker, numeral 9 represents an RF controller, numeral 10 represents a controller including, for example, a microcomputer for controlling the RF controller 9 and the TDMA/TDD processor 4. The TDMA/TDD processor 4 is provided with a transmission data processor 5 and a reception data processor 6, both capable of handling communication using two slots, as well as a timing generating circuit 7 for achieving synchronization between transmission and reception data.

The above-mentioned detection of the communication condition is achieved by detecting the signal strength of the received signal and comparing the detected signal strength with a first threshold level (first reference communication condition) as well as with a second threshold level (second reference communication condition). The means for detecting the communication condition may be provided in the RF controller or in the controller 10.

As described above, according to the present invention, communication can be continued substantially without terminating a communication session even when the communication with a terminal is transferred from one base station to another as the terminal moves around, and therefore it never occurs that a continuous communication session is regarded as a series of a plurality of separate communication sessions. Thus, it is possible to save the user from being doubly and unduly charged. In addition, it is possible to switch to the next base station quickly.

What is claimed is:

1. A mobile communications system, comprising:
    a base station for allocating a plurality of pairs of transmission and reception slots to one data frame; and
    a portable terminal for communicating with the base station,
    wherein at least two pairs of the transmission and reception slots are allocated to the portable terminal so that a first pair of said at least two pairs including a first transmission slot and a first reception slot is used to continue a communication session and monitor the communication session and a second pair of said at least two pairs including a second transmission slot and a second reception slot is used to control channels in order to secure a channel for the communication session.

2. A mobile communication system as recited in claim 1, wherein each pair of said plurality of pairs of transmission and reception slots comprises consecutive slots.

3. A portable terminal for use in a mobile communications system which comprises a base station for allocating a plurality of pairs of transmission and reception slots to one data frame, wherein at least two pairs of said transmission and reception slots are allocated to the portable terminal so that a first pair including a first transmission slot and a first reception slot is used to continue a communication session and monitor the communication session and a second pair including a second transmission slot and a second reception slot is used to control channels in order to secure a channel for the communication session, the portable terminal comprising:
    communication condition detecting means within the portable terminal for detecting whether or not a communication condition is below a first level and whether or not the communication condition is below a second level that is lower than the first level;

means for requesting another base station to newly establish a traffic channel when the communication condition drops below the first level; and means for switching from a currently used traffic channel to the newly established traffic channel when the communication condition drops below the second level.

4. A portable terminal as claimed in claim 3, wherein the communication condition is detected based on strength of a received signal.

5. A portable terminal as recited in claim 2, wherein each pair of said at least two pairs of said transmission and reception slots are consecutive.

* * * * *